United States Patent
Betts-Lacroix et al.

(10) Patent No.: US 11,612,134 B1
(45) Date of Patent: *Mar. 28, 2023

(54) ELECTRONIC MONITOR FOR EXPERIMENTAL ANIMALS

(71) Applicant: Recursion Pharmaceuticals, Inc., Salt Lake City, UT (US)

(72) Inventors: Jonathan Noble Betts-Lacroix, Belmont, CA (US); Timothy Levi Robertson, Belmont, CA (US)

(73) Assignee: Recursion Pharmaceuticals, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,150

(22) Filed: Feb. 15, 2021

Related U.S. Application Data

(63) Continuation of application No. 14/549,403, filed on Nov. 20, 2014, now Pat. No. 10,918,078.

(51) Int. Cl.
| | | |
|---|---|---|
| *A01K 1/03* | (2006.01) | |
| *G05B 13/02* | (2006.01) | |
| *A01K 29/00* | (2006.01) | |

(52) U.S. Cl.
CPC ............ *A01K 1/031* (2013.01); *A01K 29/005* (2013.01); *G05B 13/028* (2013.01)

(58) Field of Classification Search
CPC ..... A01K 1/031; A01K 29/005; G05B 13/028
See application file for complete search history.

(56) References Cited

U.S. PATENT DOCUMENTS

| | | | | |
|---|---|---|---|---|
| 6,879,971 | B1 * | 4/2005 | Keeler | G06N 3/0472 706/21 |
| 10,918,078 | B1 * | 2/2021 | Betts-Lacroix | A01K 1/031 |
| 2008/0125670 | A1 * | 5/2008 | Signorini | A61B 10/0012 600/551 |
| 2010/0111359 | A1 * | 5/2010 | Bai | A01K 29/005 382/103 |

(Continued)

FOREIGN PATENT DOCUMENTS

| | | | | |
|---|---|---|---|---|
| WO | WO-2005001768 A1 * | 1/2005 | | G06T 7/20 |
| WO | WO-2009094396 A2 * | 7/2009 | | G06K 9/00335 |

(Continued)

*Primary Examiner* — Joshua J Michener
*Assistant Examiner* — Nicole Paige Maccrate
(74) *Attorney, Agent, or Firm* — Nienstadt PLLC

(57) ABSTRACT

An electronic monitor can monitor experimental animals in a cage. The cage has one or more walls that enclose a living space for the experimental animals. The electronic monitor is coupled to the cage. The electronic monitor may include a housing adapted to be mechanically coupled to the cage in a predefined position relative to the cage. A substantially sterile barrier is provided between the living space and the external environment in this coupled state. The walls of the cage may include a signal-interface section. An electromagnetic detector may be coupled to the housing to have a line-of-sight through the signal-interface section and into the living space of the cage. The electromagnetic detector is adapted to detect electromagnetic radiation that is transmitted through the signal-interface section. A controller processes a signal received from the electromagnetic detector to determine a status of the experimental animals or the living space.

20 Claims, 7 Drawing Sheets

(56) References Cited

U.S. PATENT DOCUMENTS

| | | | |
|---|---|---|---|
| 2010/0198024 A1* | 8/2010 | Elazari-Volcani | G16H 40/67 |
| | | | 600/301 |
| 2012/0085291 A1* | 4/2012 | Conger | A01K 1/0047 |
| | | | 119/419 |
| 2016/0042038 A1* | 2/2016 | Schumacher | G06F 16/24575 |
| | | | 707/722 |

FOREIGN PATENT DOCUMENTS

| WO | WO-2012019242 A1 * | 2/2012 | A61B 7/04 |
| WO | WO-2014083433 A2 * | 6/2014 | G06N 20/00 |

* cited by examiner

ELECTRONIC MONITOR FOR EXPERIMENTAL ANIMALS

CLAIM FOR PRIORITY

This application is a continuation of U.S. patent application Ser. No. 14/549,403, filed Nov. 20, 2014, and issued as U.S. Pat. No. 10,918,078, which is incorporated herein by reference in its entirety.

TECHNICAL FIELD

This application relates to housing and monitoring experimental animals.

BACKGROUND

Research is commonly performed on experimental animals that are housed in cages. Typically, these experimental animals are small mammals, such as mice or rats. The research may involve, for example, a drug test, a nutritional test, a genetic test, a test of a surgical procedure, an optogenetics test, or another observation of a physiological or behavioral response to a change in environmental condition or other stimulus. The experimental animals may be divided into a control group and one or more experimental groups. The cages in which the animals are housed may be arrayed in racks.

The housed animals are typically checked in two ways: husbandry checks and experimental checks. Husbandry refers to serving the physiological needs of the animals. Husbandry may include observing the wellbeing of the animals, such as, for example, a health check once or twice a day to make sure that none of the animals has developed any symptoms of disease or has died. Health checks may involve looking at the animals through the transparent cage walls in situ without moving the cages, or alternatively pulling the cages partially or completely out of their racks to visually inspect the animals. Experimental checks, meanwhile, are performed to obtain data for the research being conducted. Experimental checks may involve closer examination of the animals than husbandry checks, such as involving opening the cages and removing the animals from the cages. Experimental checks may involve, for example, looking for clinical symptoms in the animals. Experimental checks may also include behavioral tests, such as, for example, water maze or hole board tests, extractions of blood or tissue from the animals, or measurements such as imaging of the animals.

However, the data obtained from checking the animals may have limited value. Since human technicians may be needed to perform the checks and the checks may perturb the animals, these checks are performed only at certain times. Thus, the data typically represents only a relatively small set of data points for any given animal.

Furthermore, opening the animals' cages, removing them from their cages, and performing measurements on them—or even just approaching the cage to view the animal through the bidirectionally transparent wall, or partially sliding the cage containing the animal out of a rack—can physiologically or psychologically perturb the animals. The consequences of these types of perturbations are often not well understood. Furthermore, there may be inconsistencies in the perturbations, such as differences in when and how the human technicians perform checks across different individual animals. The animals' physiological states and behavior may therefore be altered in ways that are difficult to predict and inconsistent between distinct animals. Thus, these measurement techniques can interfere significantly with the quality of the data obtained from the experiment.

The process of checking the experimental animals may also cause contamination of the animal's living space or the testing equipment. This contamination may, in turn, exacerbate the differences in conditions under which the animals are housed. For example, one human technician may introduce one particular foreign odor into one living space, while another human technician introduces a different odor into another living space. The human technicians who are handling animals from different cages, or using common equipment, may also cause cross-contamination between animals in different cages.

In addition, a substantial amount of resources, such as the time and labor of skilled technicians, is expended to monitor the animals. This can account for a significant amount of the total cost of running such an experiment.

Thus, it is desirable to perform checks on experimental animals in a way that yields high-resolution and reliable data in relation to the number of animals. It is also desirable to avoid inconsistent perturbations of the animals, and cross-contamination between animals in different cages, when the animals are checked. Moreover, it is desirable to reduce the amount of time and labor that is expended on running the animal experiment.

SUMMARY

In one embodiment, an electronic monitor is provided for monitoring one or more experimental animals in a cage when coupled to the cage in a predefined coupling position. The cage comprising one or more walls that enclose a living space for containing the experimental animals. At least one of the walls comprising a signal-interface section. The electronic monitor comprises a housing adapted to be mechanically coupled to the cage in a predefined position relative to the cage when the electronic monitor is coupled to the cage. There is a substantially sterile barrier between the living space and the external environment when the electronic monitor is coupled to the cage. An electromagnetic detector is coupled to the housing at a predefined position, the predefined position having a line-of-sight through the signal-interface section and into the living space of the cage when the electronic monitor is coupled to the cage. The electromagnetic detector is adapted to detect electromagnetic radiation that is transmitted through the signal-interface section. A user interface is provided to receive an input from a human supervisor. A controller is provided to (1) receive a signal from the electromagnetic detector that relates to the detected electromagnetic radiation, (2) receive the input from the user interface, and (3) process one or more of the received signal and the human input to determine a status of the experimental animals or the living space.

In another embodiment, an electronic monitor is provided for monitoring one or more experimental animals in a cage when coupled to the cage in a predefined coupling position. The cage comprises one or more walls that enclose a living space for containing the experimental animals. At least one of the walls comprises a signal-interface section. The electronic monitor comprises a housing adapted to be mechanically coupled to the cage in a predefined position relative to the cage when the electronic monitor is coupled to the cage. There is a substantially sterile barrier between the living space and the external environment when the electronic monitor is coupled to the cage. An electromagnetic detector is coupled to the housing at a predefined position, the predefined position having a line-of-sight through the signal-interface section and into the living space of the container when the electronic monitor is coupled to the cage. The electromagnetic detector is adapted to detect electromagnetic radiation that is transmitted through the signal-interface section. A controller is provided to (1) receive a signal from the electromagnetic detectors that relates to the detected electromagnetic radiation, and (2) process the signal from the electromagnetic detector to determine one or more of: (i) a health check, (ii) a Body Condition Score ("BCS") of one of the experimental animals, (iii) a temperature in the living space, (iv) temperature sleep or awake state of one of the experimental animals, (v) whether one of the experimental animals has died, an amount of water, (vi) the number of experimental animals in the cage, and (vii) an illumination level in the living space.

In yet another embodiment, an electronic monitor is provided for monitoring one or more experimental animals in a cage when coupled to the cage in a predefined coupling position. The cage comprises one or more walls that enclose a living space for containing the experimental animals, at least one of the walls comprising a signal-interface section. The electronic monitor comprises a housing adapted to be mechanically coupled to the cage in a predefined position relative to the cage when the electronic monitor is coupled to the cage. There is a substantially sterile barrier between the living space and the external environment when the electronic monitor is coupled to the cage. An electromagnetic detector is coupled to the housing at a predefined position, the predefined position having a line-of-sight through the signal-interface section and into the living space of the container when the electronic monitor is coupled to the cage. The electromagnetic detector is adapted to detect electromagnetic radiation that is transmitted through the signal-interface section. A controller is provided to (1) receive a signal from the electromagnetic detectors that relates to the detected electromagnetic radiation, and (2) process the signal from the electromagnetic detector to output: (i) a state signal that indicates a status of the experimental animals or the living space, and (ii) a confidence level corresponding to a level of confidence in the accuracy of the state signal.

In still another embodiment, a method is provided of monitoring one or more experimental animals in a cage. The cage comprises one or more walls that enclose a living space for containing the experimental animals, at least one of the walls comprising a signal-interface section. The monitoring of the experimental animals does not substantially affect a chemical and biological sterility of the living space. The method comprises detecting electromagnetic radiation at a predefined position outside of the cage, the predefined position being selected so that the detected electromagnetic radiation has emanated from the living space and passed through the signal-interface section of the cage. A signal is received from the electromagnetic detector that relates to the detected electromagnetic radiation. The method further comprises processing the signal from the electromagnetic detector to monitor the experimental animals.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments and aspects of the transmission electron microscopes described herein and, together with the description, serve to explain the principles of the invention.

DETAILED DESCRIPTION

An electronic monitor may be adapted to be removably coupled to a cage housing experimental animals to be positioned in a predefined position relative to the cage and monitor one or more of the experimental animals. The electronic monitor can be adapted to maintain a substantially sterile barrier between the animal living space in the cage and the environment external to the cage while the electronic monitor is coupled to the cage. Sterility refers to chemical and biological isolation from the ambient environment, such as, for example, isolation from foreign odors, soot particles, viruses, parasitic worm eggs, bacteria, prions, proteins, metabolites, parasitic mites and their eggs, and humidity and temperature fluctuations. The electronic monitor can thereby monitor the experimental animals while minimizing perturbations to the animals.

Figure 1A:
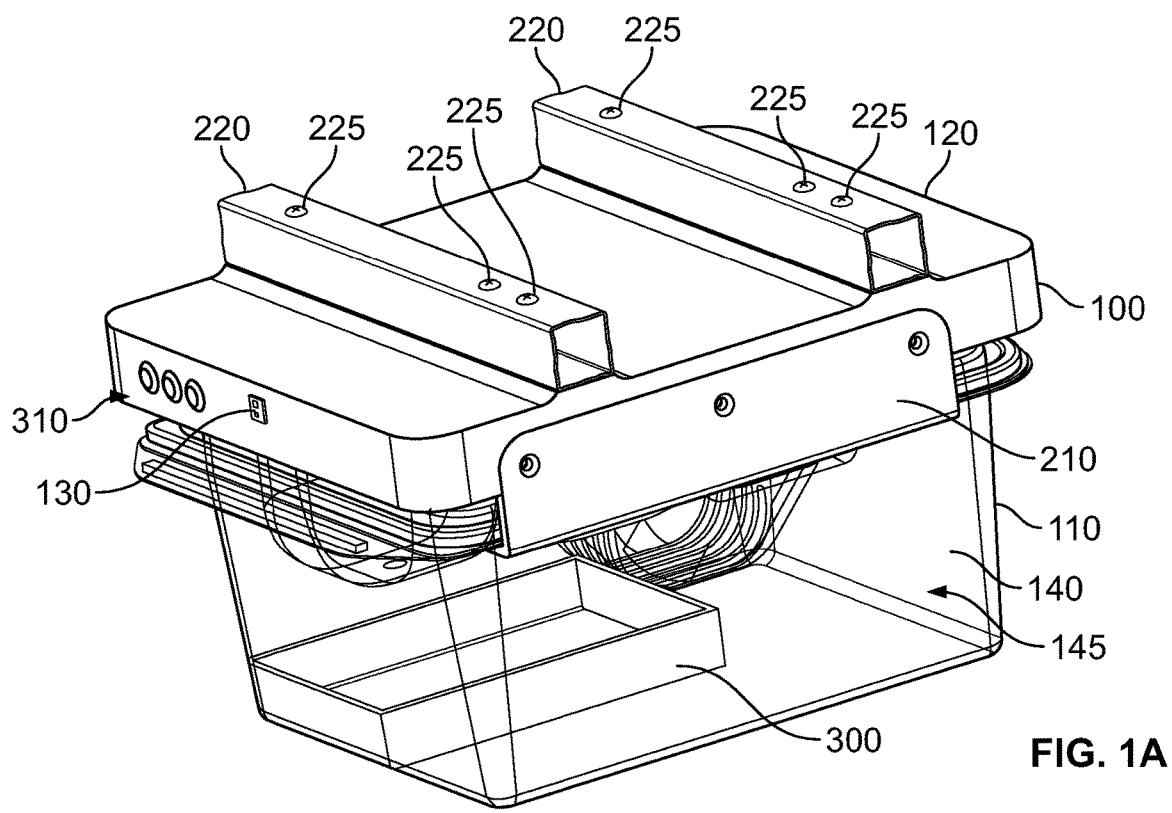
FIGS. 1A and 1B are three-dimensional perspective views of line drawings of an example of an embodiment of an electronic monitor that is coupled to a cage.
Figure 1B:
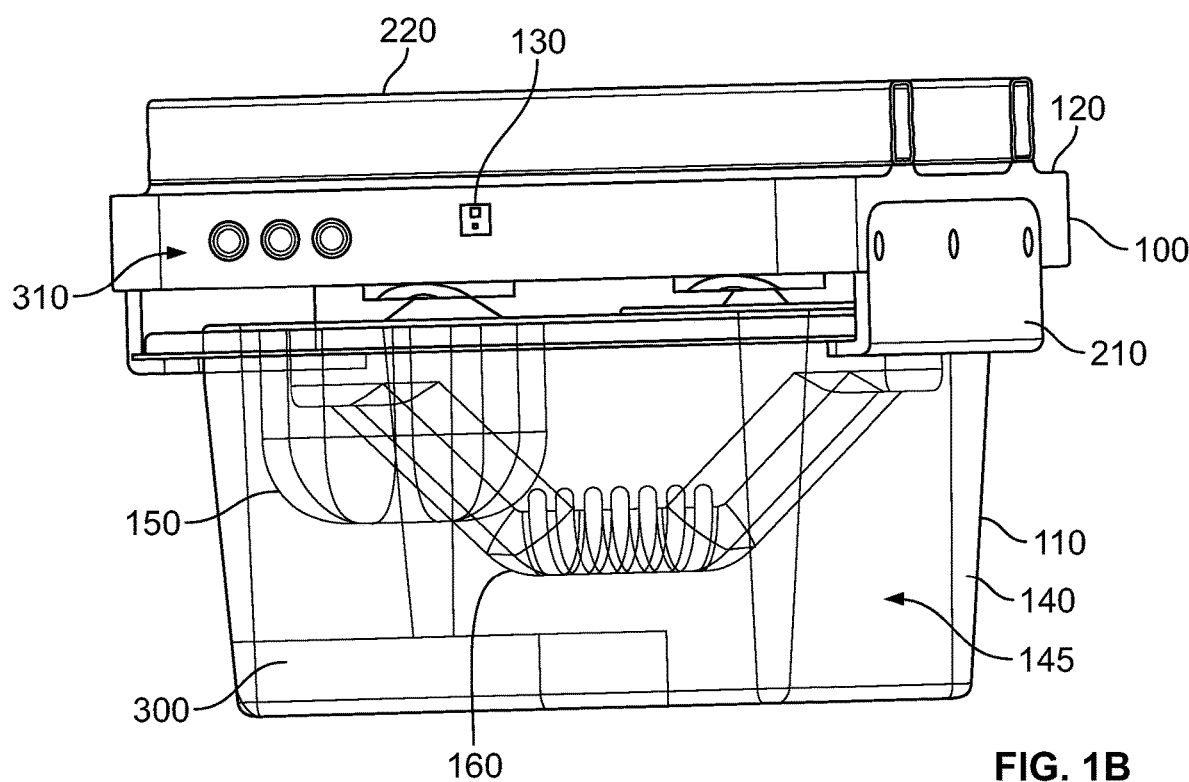

FIGS. 1A and 1B illustrate an example of an embodiment of an electronic monitor 100 and a cage 110 that are mechanically coupled to each other.

Electronic monitor 100 has a housing 120 to which electronic and/or other components of electronic monitor 100 are attached. Housing 120 may form a substantially airtight enclosure around sensitive components of electronic monitor 100. These sensitive components may include, for example, cameras, microphones, electromagnetic sources, electronic circuitry, and optical components such as fiber optics. For example, housing 120 may include one or more seals or gaskets to be capable of maintaining an airtight environment around the key or sensitive components of electronic monitor 100. Electronic monitor 100 may also have one or more ambient sensors 130 to determine characteristics of the environment outside cage 110. Ambient sensors 130 may determine, for example, an outside light level or temperature, or to detect ambient sound.

Cage 110 has one or more walls 140 that enclose living space 145 of the experimental animals. In one embodiment, walls 140 define a living space 145 that is approximately a rectangular prism. In other embodiments, however, walls 140 may have other shapes or dimensions. In illustrative examples, a mouse cage may be shaped and sized to house from one to about five mice, while a rat cage may be capable of housing up to about 10 mice. For example, mice may be housed singly or in pairs. In one embodiment, walls 140 of cage 110 enclose a substantially cuboid living space 145 of at least 10 cm×10 cm×5 cm.

Cage 110 may also include shaped features to provide water and/or food to the experimental animals. For example, cage 110 may have a water dispenser 150. Cage 110 may also have a food dispenser 160. If cage 110 is of a disposable type, then water dispenser 150 and/or food dispenser 160 may be pre-filled with an amount of water or food corresponding to an expected lifespan of the animals, an expected timespan of an experiment, or a given interval between cage changes. A given interval between cage changes may be, for example, one, two, or four weeks, such as may be suitable for the particular types of cage, animal, and experiment.

Figure 2A:
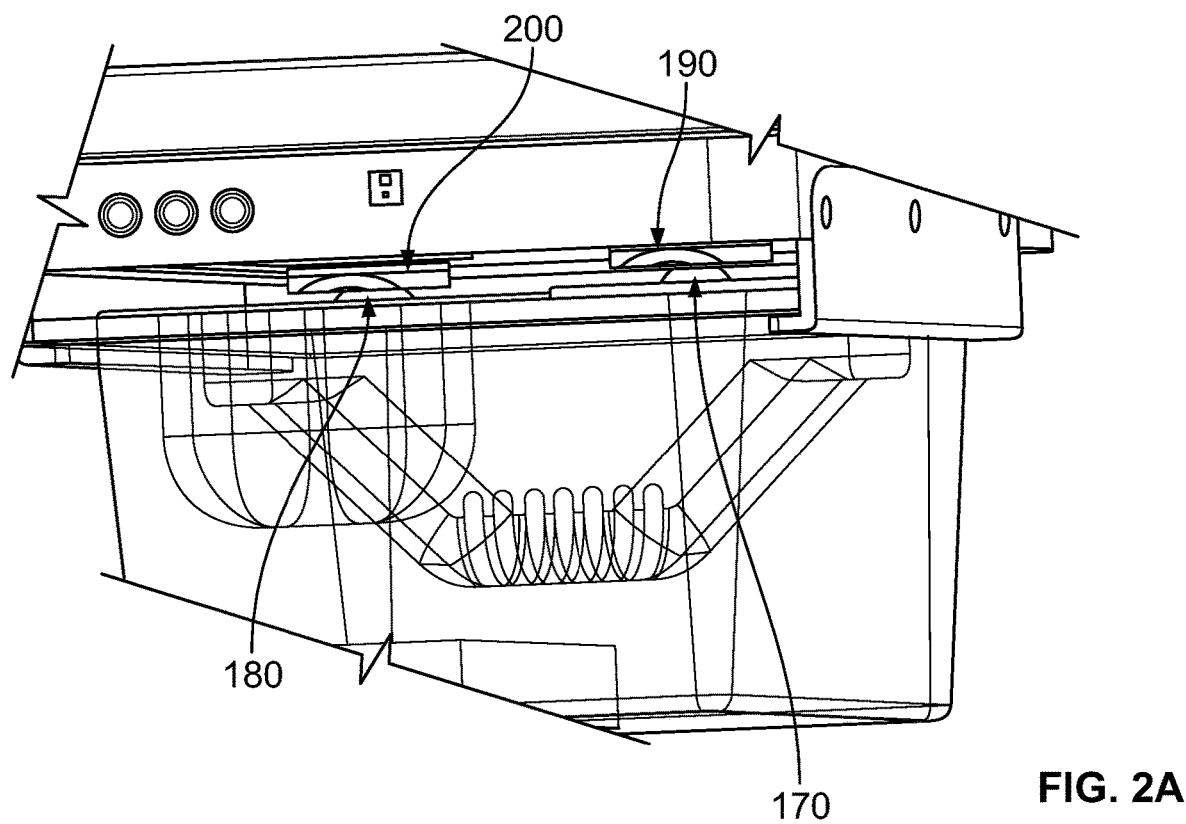
FIGS. 2A and 2B are three-dimensional perspective views of line drawings of the example of the electronic monitor coupled to the cage that is illustrated in FIGS. 1A and 1B.
Figure 2B:
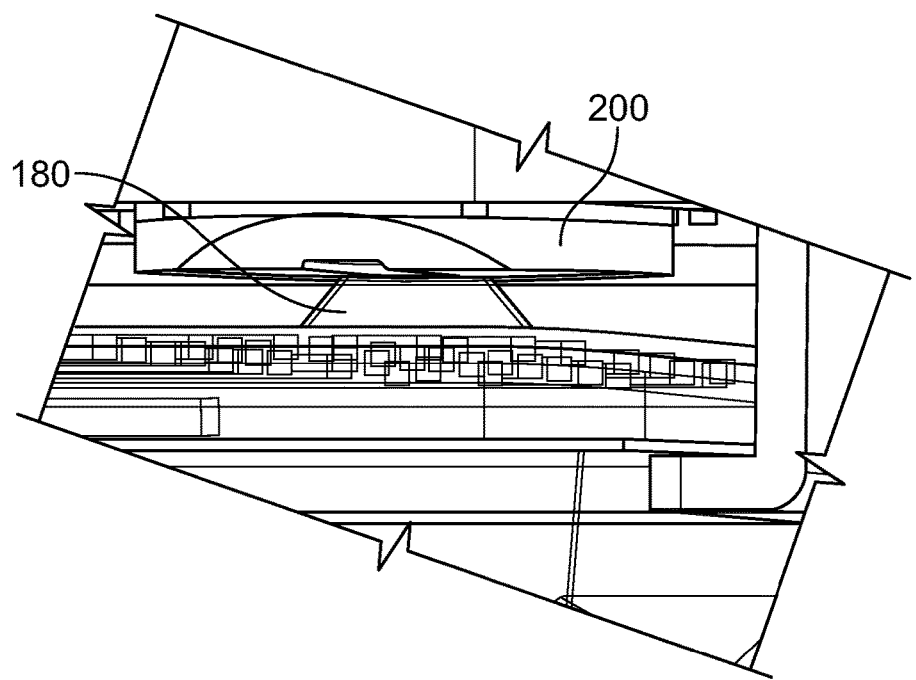

Cage 110 may include at least one air inlet for clean air, and at least one air outlet for contaminated air. In one example, illustrated in FIGS. 2A and 2B, cage 110 has air nipples 170, 180 that structurally complement air inlet 190 and air outlet 200, respectively. Air inlet 190 and air outlet 200 may couple to an external air supply conduit and an air exhaust conduit, respectively.

Electronic monitors 100 may be structurally adapted to permit easy and fast uncoupling of cages 110 from electronic monitors 100 by a human technician or even by a robot. For example, electronic monitors 100 may be structurally adapted to permit coupling and uncoupling by sliding cages 110 into and out of electronic monitors 100. Returning to FIGS. 1A and 1B, in one version, electronic monitors 100 have arms 210 extending from housing 120 to support cages 110, such as for example L-shaped arms 210 extending from under housing 120 to stably hold cages 110 underneath housing 120. Furthermore, when a cage 110 is slid into electronic monitor 100, air nipples 170, 180 may mechanically snap into air inlet 190 and air outlet 200, respectively, to create substantially sealed air channels and hold cage 110 in place with respect to electronic monitor 100.

Multiple cages 110 that are coupled to respective electronic monitors 100 may be mechanically supported in arrays by a rack. Cages 110 may be supported by the rack by nonpermanent mechanical coupling, such that they can be easily removed from the rack if desired. For example, electronic monitors 100 may be supported by mounting rails 220 of the rack to stably hang electronic monitors 100 from the rack (or, in alternative versions that are not illustrated here, electronic monitors 100 may attach to mounting rails 220 from a side of electronic monitors 100 or even underneath cage 110). Electronic monitors 100, in this example, may be attached to mounting rails 220 of the rack by bolts 225 that pass through holes in rails 220.

The rack may also structurally provide one or more resources used in the cage, such as, for example, conveying clean air and exhausting used air, electrical power, electrical or optical signals, water, and nutrients for the experimental animals. For example, an air supply conduit and an air exhaust conduit adapted attach to cage 110 may extend from the cage rack or even constitute part of the rack itself. Similarly, electrical wiring for power and transmission of signals may be extended inside or along the beams of the rack and connect to electronic monitors 100, such as via complementary ports, for example through respective "male" and "female" connectors, on electronic monitors 100 and the rack.

Figure 3:
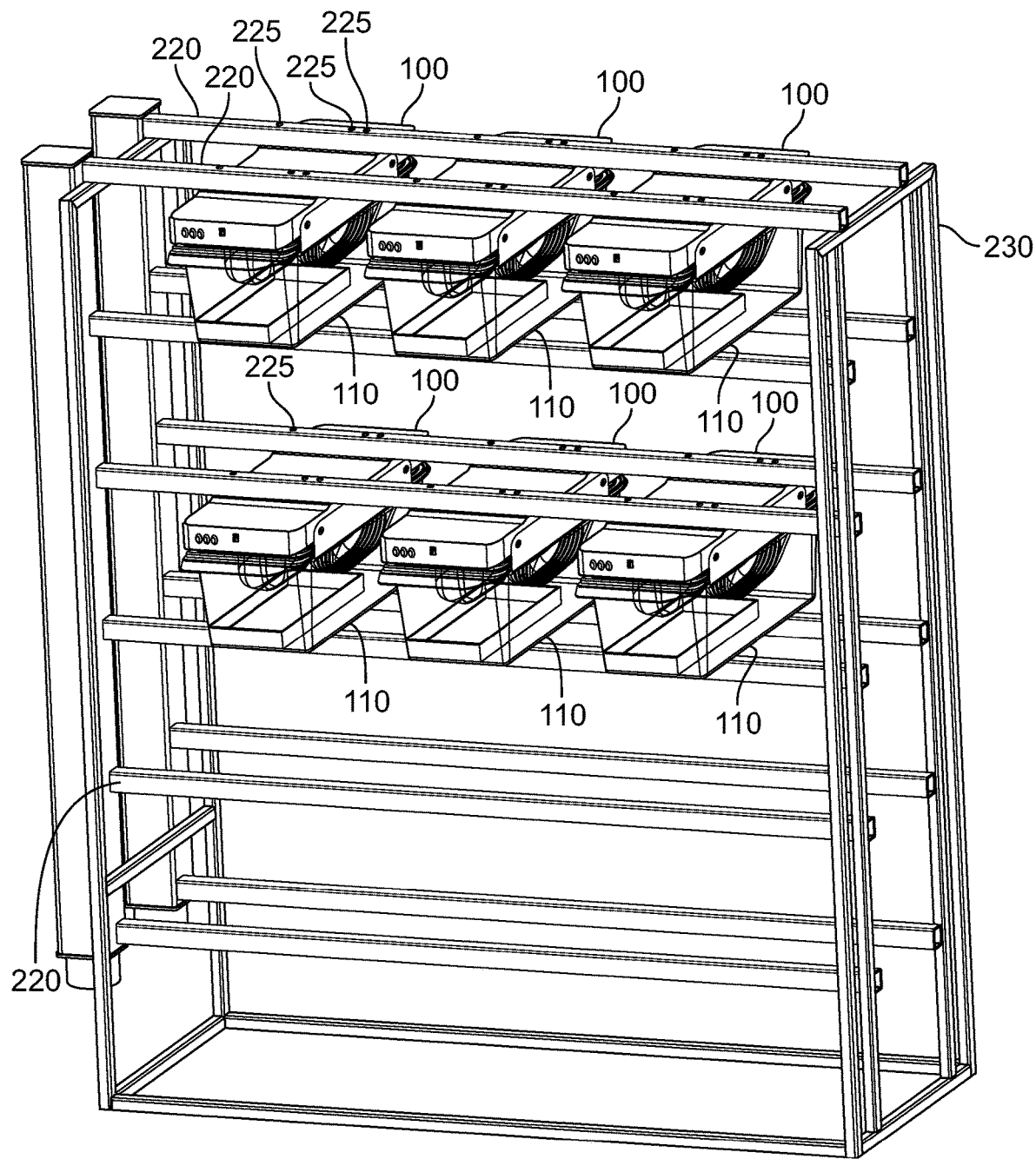
FIG. 3 is a three-dimensional perspective view of an example of an embodiment of a rack having multiple electronic monitors coupled to respective cages and arranged in a two-dimensional rectilinear grid array.

In certain embodiments, the rack supports the cages in a two-dimensional or three-dimensional rectilinear grid array. FIG. 3 illustrates an example of an embodiment of a rack 230 that supports multiple cages 110 coupled to respective electronic monitors 100, which are arranged in the rack in a two-dimensional rectilinear grid array. However, racks may be implemented that support other suitable assemblages of cages 110. For example, a rack may be adapted to allow cages 110 to be stacked in a rotatable cylindrical array. In other examples, the rack may be adapted to stack cages 110 in hexagonal, diagonal, or other configurations.

Figure 4:
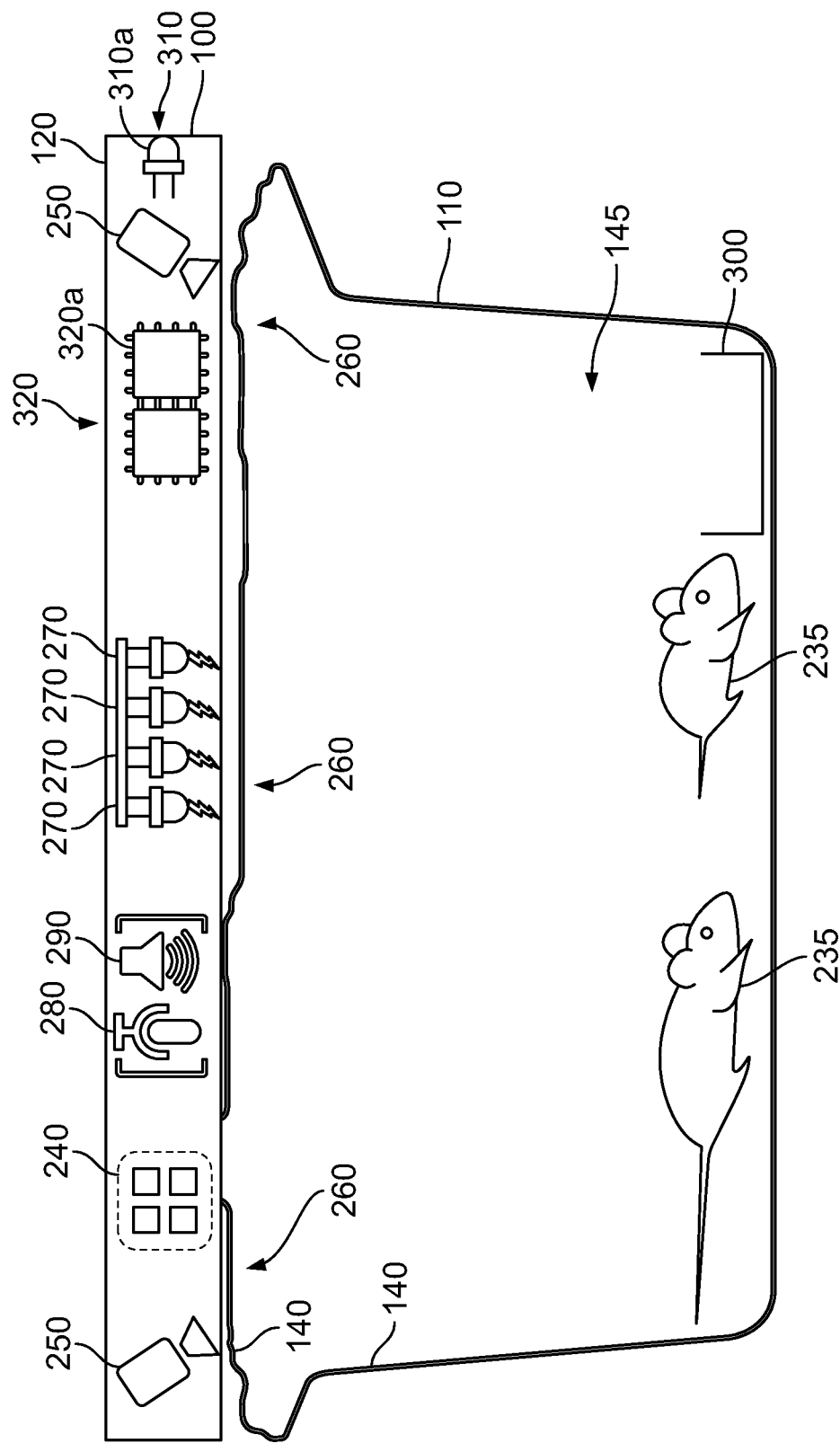
FIG. 4 is a schematic illustration side view of an example of an embodiment of an electronic monitor coupled to a cage.

FIG. 4 is a schematic illustration of a side view of an example of an embodiment of an electronic monitor 100 coupled to a cage 110 that houses experimental animals 235. Electronic monitors 100 may permit high-resolution and reliable data to be collected on the experimental animals while substantially avoiding inconsistent perturbations of the animals or cross-contamination between animals. And, electronic monitors 100 may be able to provide these advantages without substantially interfering with other aspects of conventional animal husbandry workflows. Electronic monitors 100 may thus be incorporated into an existing animal husbandry workflow without requiring revamping of various aspects of the workflow, such as technician training and existing equipment.

Electronic monitor 100 may include one or more atmospheric sensors 240 to detect one or more atmospheric conditions inside cage 110. Sensors 240 may include, for example, a humidity sensor to detect water vapor. The humidity sensor can be used, for example, to detect whether the cage has undesirably flooded with water or another liquid. Sensors 240 may also include sensors to detect percentage levels of various gases. For example, sensors 240 may include an ammonia sensor to detect a level of ammonia ($NH_3$) in the atmosphere of cage 110. A level of ammonia that is above a particular level may indicate an undesirably high level of waste of the experimental animals, for example, and therefore a desirability of replacing the flooring or bedding, moving the animals to another cage, or cleaning the cage. Sensors 240 may additionally include a carbon monoxide sensor to detect a level of carbon monoxide (CO) in the cage, a nitrogen dioxide sensor to detect a level of nitrogen dioxide ($NO_2$) in the cage, one or more sensors for a preselected group of oxidizing gases, and/or one or more sensors for a preselected group of reducing gases. Furthermore, sensors 240 may include a temperature sensor to detect a temperature inside the cage. Atmospheric sensors 240 may be disposed in contact with air coming out of cage 110, such as in the path of the air outlet, to avoid contamination of the inside of cage 110 while obtaining a desirably accurate reading of current atmospheric conditions inside cage 110.

The electronic components of electronic monitor 100 may also include one or more electromagnetic detectors 250, such as shown in the example of FIG. 4. Detectors 250 may be coupled to housing 120 at predefined positions. For example, these predefined positions may have a line-of-sight through one or more signal-interface sections 260 and into living space 145 of cage 110 when electronic monitor 100 is coupled to cage 110. The "line-of-sight" refers to a possible path of propagation of electromagnetic radiation that is suitably transparent for detection of the electromagnetic radiation by detectors 250. The path of propagation may either form a substantially straight line or change direction one or more times (the latter type being referred to here as an "indirect" line-of-sight). Electromagnetic detector 100 may thereby be adapted to detect electromagnetic radiation that is transmitted through signal-interface sections 260. In one example, one or more of electromagnetic detectors 250 has an indirect line-of-slight through section-interface section 260 into living space 145 of cage 110, such as shown in the example of FIG. 4. Furthermore, if housing 120 has a substantially airtight enclosure, the substantially airtight enclosure may be designed to contain electromagnetic detectors 250 therein to protect electromagnetic detectors 250 from dirtying or damage by the outside environment.

In one version, at least one of the electromagnetic detectors of the electronic monitor comprises a camera. The camera may be able to capture video or, in other cases, still images. The optics of the camera may be, for example, conventional camera optics, light-field camera optics, or structure-of-light camera optics. Furthermore, the camera may be adapted to capture an image in any suitable range of wavelengths, such as, for example, the visible spectrum, near infrared range, or far infrared range. For example, the camera may be adapted to detect radiation in the far infrared range to generate a signal that electronic monitor 100 uses to determine temperatures in cage 110.

The camera may be adapted to capture multiple different images of substantially the same area inside the cage, which can be processed together to enhance the data richness, such as the image resolution, of the observed area. For example, two or more such images may be digitally processed to deconvolve scratches and/or other imperfections in the transparency of the cage from the image. In one exemplary embodiment, the camera is adapted to be repeatedly physically shifted between at least two predefined positions in order to capture respective images from at least two different perspectives. Alternatively, the camera could be held still while a mirror or other optical device is physically shifted between at least two predefined positions in order to capture the images from the two or more optical perspectives. Alternatively or in addition, the camera may be a light-field camera that is adapted to capture two or more images simultaneously at different focus levels. In yet another embodiment, two or more fixed cameras may be positioned next to each other to simultaneously capture two or more images of substantially the same area from slightly different perspectives.

Electronic monitor 100 may also have one or more electromagnetic sources 270, which may be coupled to housing 120 at a predefined position that has a line-of-sight into living space 145 of cage 110, such as through signal-interface section 260. Sources 270 may be adapted, in one embodiment, to illuminate one or more desired areas of living space 145 to enhance detection by electromagnetic detectors 250. For example, one of sources 270 may illuminate an area of living space 145 with light at one or more wavelengths that are selected to reduce or minimize perturbation of experimental animals 235, and the illuminated area of living space 145 may be observed via one of electromagnetic detectors 250 that is adapted to detect light at those preselected wavelengths.

Housing 120 of electronic monitor 100 may have a substantially flat wall of one of walls 140 that is adapted to, when electronic monitor 100 is coupled to cage 110, be positioned approximately adjacent to signal-interface section 260 of cage 110. For example, if cage 110 is mounted directly underneath electronic monitor 100, such as shown in the examples of FIGS. 1A, 1B, and 3, then signal-interface section 260 may be located in a top wall of cage 110. In one version, cage 110 is disposable between cycles of housing a set of experimental animals. If cage 110 is disposable between each cycle of use, then signal-interface section 260 may be any substantially transparent area of walls 140 of cage 110. Signal-interface section 260 may be a portion of one of cage walls 140 that is structurally and materially substantially the same as the neighboring area of the same cage wall 140.

In another version, however, cage 110 is adapted to be reusable. For cage 110 to be reusable, it may be preferable to maintain at least a predetermined degree of transparency of signal-interface section 260 to the electromagnetic signals communicated by electromagnetic detectors 250 and/or electromagnetic sources 270 of electronic monitor 100. In one embodiment, the wall of cage 110 that contains signal-interface section 260 may be adapted to permit washing between cycles of use while maintaining at least a predefined degree of transparency of signal-interface section 260. In another embodiment, signal-interface section 260 may be contained in a removable wall portion of walls 140 cage 110 that is adapted to fit into cage 110 while preserving a sterile barrier between electronic monitor 100 and cage 110. The removable wall portion may be made of a harder or more scratch-resistant material than the surrounding area of the wall, or a material having a surface that is adapted to remain more clean and transparent than the surrounding area. For example, signal-interface section 260 may be made of glass while the neighboring area of the cage wall does not comprise glass. In still another embodiment, signal-interface section 260 is adapted to be treated between uses of cage 110 to achieve the predefined degree of transparency. For example, signal-interface section 260 may be adapted to be heat polished or treated by application of an elastomeric micro-gap-filling contact adhesive between uses of cage 110 to achieve the predefined degree of transparency. Alternatively or in addition, the removable wall portion may constitute a disposable section of the wall that is suitably transparent and can be replaced between one or more uses of cage 110.

Electronic monitor 100 may further include one or more acoustic sensors 280, such as microphones, to capture sounds from inside cage 110. Acoustic sensors 280 may be adapted to capture sounds in any suitable range of frequencies, such as, for example, in an infrasonic, human-audible, or ultrasonic range. Acoustic sensors 280 may be adapted to capture sounds in the range of from about 0 Hz to about 100 kHz. In one example, acoustic sensors 280 may be adapted to capture sounds in the range of from about 15 kHz to about 35 kHz to listen to mouse vocalizations. In another example, acoustic sensors 280 may be adapted to listen for predefined distinctive sounds made by experimental animals under known conditions.

Furthermore, electronic monitor 100 may have acoustic emitters 290 to transmit sounds into cage 110. In one version, acoustic emitters 290 transmit one or more sounds into living space 145 that are stimuli to observe a response, or obtain a predicted response, from the experimental animals. These acoustic stimuli may be part of the overall experiment being performed on the animals, for example. The acoustic stimuli may, for example, simulate noises created by the same type of experimental animals. Alternatively or in addition, acoustic emitters 290 may be used in a noise-canceling mode to substantially cancel out unwanted noises created in the environment outside cage 110. These may include, for example, loud or sudden noises by nearby laboratory staff, equipment, or animals in other cages that may otherwise perturb the experimental animals.

In one version, a weight scale 300 is provided inside the cage to measure the mass of an experimental animal. Weight scale 300 may transmit the measured mass data to electronic monitor 100 by electromagnetic transmission that does not substantially affect the sterility barrier between living space 145 in cage 110 and electronic monitor 100. For example, weight scale 300 may transmit the measured mass information to electronic monitor 100 by a modulated near-infrared beam or radio frequency (RF) signal.

Weight scale 300 may be located in living space 145 where an experimental animal can identifiably or predictably stand on scale 300. Weight scale 300 may also be adapted to permit only a single individual of experimental animals at a particular time to stand on scale 300. In one embodiment, for example, weight scale 300 is placed underneath water container (such as water container 150 shown in FIG. 1B) such that an experimental animal (such as, e.g., a mouse) activates weight scale 300 and can be weighed when it drinks from the water container. Since each animal may require regular water intake, this configuration can ensure that each animal is weighed regularly. However, other embodiments are possible. For example, electronic monitor 100 may provide another type of reward or a stimulus to experimental animals 235 that encourages them to individually stand on weight scale 300. In still another embodiment, which may be suitable if the experimental animals in one cage are under substantially identical experimental conditions, more than one of the experimental animals may be weighed simultaneously.

Electronic monitor 100 may also include one or more user interfaces 310 to display information to a human supervisor or receive one or more inputs from the human supervisor. The human supervisor may be, for example, an animal-husbandry technician who is responsible for the physiological and psychological condition of the animals, a scientist who is conducting the experiment on the animals, or another kind of human analyst. One or more of user interfaces 310 may be adapted to display a compilation of information received from electronic monitors 100 at individual housings 110 of electronic monitors 100, at the level of the rack (such as rack 230 shown in FIG. 3), or at client devices such as personal computers or handheld devices. The compilation may be, for example, a summary or parallelized display of information derived from electronic monitors 100. The presented information may include one or more of raw data from ambient sensors 130 of electronic monitors 100, raw data from atmospheric sensors 240, raw data from electromagnetic detectors 250, raw data from acoustic sensors 280, raw data from weight scales 300 inside cages 110, and information resulting from processing of such raw data by one or more of controllers 320. For example, user interfaces 310 may be adapted to display a plurality of metrics to the human supervisor as a guide, receive an input relating to one or more of the metrics from the human supervisor, and navigate through raw data associated with the metrics based on the human input. For example, the human input may be associated with a status of experimental animals 235.

Certain user interfaces 310a may be disposed on housing 120 of electronic monitor 100 itself, or, additionally or alternatively, at one or more remote locations. User interfaces 310 may include, for example, one or more light-emitting diodes (LEDs) (such as shown in FIG. 4 by user interface 310a), two-dimensional color displays, or acoustic speakers.

Electronic monitors 100 may also include at least one controller 320 to control the operation of electronic monitors 100, control user interfaces 310 to interface with a human supervisor, and/or interface with an external server or network. Controller 320 may automatically control one or more aspects of operation of electronic monitor 100, and may be adapted to largely or wholly automate the operation of electronic monitor 100. The controller may, for example, receive inputs from a human user, provide instructions to other components of monitor 100, perform processing of data received from ambient sensors 130, atmospheric sensors 240, electromagnetic detectors 250, acoustic sensors 280, and weight scale 300, and/or output signals, such as alerts or other indicators. Controller 320 may be adapted, for example, to receive signals from ambient sensors 130, atmospheric sensors 240, electromagnetic detectors 250, acoustic sensors 280, and weight scale 300, and to transmit control signals to electromagnetic sources 270 to provide electromagnetic radiation into living space 145, or to transmit signals to acoustic emitters 290, or to transmit signals to user interfaces 310.

Controller 320 may include one or more microprocessors, controllers, processing systems, computers, and/or circuitry, such as any combination of hardware or software modules. Components of the controller may be distributed across one or more different physical locations and these components may communicate with each other to perform the operations of the controller. For example, components of controller 320 may be physically located at the individual electronic monitors 100, such as at the level of rack 230 (e.g., connected to rack-level data input and output ports), and/or at remote client devices such as personal computers or handheld devices.

Controller 320 may be implemented in any quantity of hardware components, such as including Raspberry Pi, an integrated circuit such as, for example, an application-specific integrated circuit (ASIC), field-programmable gate array (FPGA), or "system on a chip" (SoC), and/or other processor, memory, bus, input/output, or communications systems. Furthermore, some or all of these hardware components may be located locally or remotely. For example, controller 320 may be implemented partially or entirely through cloud computing. Controller 320 may operate any commercially available operating system software, including, for example, Linux, Windows, MacOS, iOS, Android, Unix, OS/2, or any other commercially available and/or custom software. For example, controller 320 may operate customized animal-monitoring and signal-processing software. Furthermore, controller 320 may include one or more types of input devices, such as for example a touchpad, keyboard, button panel, mouse, microphone, or voice recognition device.

Controller 320 may be adapted to process received data and/or human inputs to determine values of one or more metrics relating to experimental animals 235 or living space 145. The metrics may include one or more physiological, behavioral, or environmental metrics. Physiological metrics may include, for example, health check, heart rate, body weight, thinness, body temperature, respiration, metabolism, coat characteristics such as rough hair coat, stress level, a Body Condition Score ("BCS"), alopecia, whether the animal is dead, ataxia or another central nervous system (CNS) disorder, circling or head tilt, dehydration, dermatitis, distended abdomen, dyspnea, dystocia, ear problems, emaciation, eye problems, fight wounds, hunched posture, hydrocephalus, irregular gait, lesions, lethargy, listlessness, malocclusion, necropsy, the number of animals in a cage, paleness of color, the presence of post-operative staples, prolapse, pruritus, seizure, other sickness, or the presence of a tumor. Behavioral metrics may include, for example, activity states and patterns, food and water consumption by the experimental animals, whether an animal appears to be missing from a particular region or the entire cage, a sleep or awake state, an animal biting itself, an animal biting its tail, a caught or trapped state of an animal, contact between animals, defecation, urination, drinking, eating, exercise, foraging, grooming, a hunched posture, inactivity, nose-poking, rearing up, running, repetitive behavior, licking, scratching, fighting, wincing, and sociability. Environmental metrics may include, for example, an amount of water or food remaining for consumption by the animals in a cage, high or low humidity, high or low ammonia level, high or low environmental temperature, illumination level, an ajar state or equipment, a broken state of equipment, a slotted or unslotted state of the cage, an open state of the cage, a change in bedding, a fill-up of food or water, maximum or minimum humidity for a rack containing the cage, maximum or minimum temperature for a rack containing the cage, and general cage or rack problems.

Controller 320 may present one or more of the monitored metrics on one or more of user interfaces 310 for observation by a human supervisor. In one version, the monitored metrics are displayed to the human supervisor in a "fused" manner. This means that the monitored metrics are displayed or otherwise presented to the human supervisor in a compact or ergonomic manner that overlays, joins, or compares a plurality of metrics that are being, or have been, monitored. For example, temperatures or measurements of activity in different cages may be overlapped in the same plot for ready visual comparison by the human supervisor. This may allow the human supervisor to efficiently or ergonomically observe the conditions in different cages, or evaluate the conditions in a particular cage of interest relative to other cages.

Multiple animals that are under the same experimental conditions may be selected to be housed in the same cage. For example, animals in a control group may be housed together, while animals in a particular experimental group may be housed together. When animals that are under the same experimental conditions are housed in the same cage, it may not be necessary for electronic monitor 100 to track the individual identities of the animals. Rather, since the mice may be treated as experimentally identical, aggregated or averaged information relating to all of the mice in a particular cage may suffice for purposes of the experiment.

Controller 320 may be adapted to process one or more input signals received from the human supervisor through one or more of user interfaces 310 as inputs to a machine learning algorithm that is executed by controller 320. For example, controller 320 may display to the human supervisor, via one of user interfaces 310, a condition inside the cage, such as a predicted status of an experimental animal. This may be referred to as a "state signal." The predicted status of an experimental animal may be, in one example, that the animal is healthy or sick. Controller 320 may simultaneously display a level of confidence that controller 320 has in its prediction of the condition. The human supervisor may observe the experimental animal, either remotely through the user interface or in person, and confirm or reject the prediction. Alternatively or in addition to confirmations and rejections, the human supervisor may provide feedback by setting parameters under which controller 320 predicts the condition. Based on this repeated feedback from the human supervisor, controller 320 may automatically learn to associate a received signal with a particular condition.

Furthermore, the human supervisor may annotate a particular range or point, in time or space, of a monitored metric, such as including an audiovisual record of the experimental animals. In one example, for the sake of illustration, if a human supervisor observes one of the experimental animals acting in a manner that he does not recognize, he may flag a temporal and spatial range of video of the experimental animal that shows the behavior of interest, or the condition of interest of the animal or the animal's environment, and add an annotation describing a request for a second human supervisor to review the selected video footage. In addition or alternatively to the video footage, the human supervisor may flag a temporal and/or spatial range of metrics, such as, for example, a range of plotted temperature or physical movement over a selected period of time. In one illustrative example, the flagged range of video or certain metrics lasts for about 10 seconds. In another example, the flag is representative of an instant in time. In yet another example, however, the flagged range is a time-lapse series of images from the video or the measured metrics. Furthermore, a flag type may simultaneously have multiple roles, such as to add a descriptive annotation to the flagged temporal and spatial range of video or other measured metrics, as well as to implicitly trigger a request to a second human supervisor to review the flagged portion.

The annotations may describe or otherwise relate to any of the physiological, behavioral, or environmental metrics described above. In addition, the annotations may relate to, and are not limited to, clinical observation, blood collection, tissue collection, dosing, anesthesia, euthanasia, a conclusion drawn after a visual check, remote check, or recheck or an animal by a human supervisor, change in illumination of the living space of the cage, cage change, bedding change, food or water refill, or special delivery of food or water.

Arraying electronic monitors 100 may enable a human supervisor to oversee the condition of experimental animals 235 at a high level, in parallel, and therefore more efficiently than conventional approaches. For example, electronic monitors 100 may perform automatic and continuous monitoring of certain metrics that could otherwise consume a substantial amount of time when they are manually checked by human technicians. These metrics may include, for example, the animal's vital signs, the animal's weight, the animal's size, the quality of the animal's coat, another kind of health check on the animal, or a "body condition score" ("BCS") of the animal. The arrayed electronic monitors 100 may be adapted to alert the human supervisor when a particular cage deserves more dedicated human attention and to inform the human supervisor of the reason for alerting him in regard to that particular cage. For example, the arrayed electronic monitors 100 may ask the human supervisor to resolve a case that the automatic monitoring deemed to be ambiguous.

Arrayed electronic monitors 100 may thus improve the wellbeing of the experimental animals, improve the accuracy and richness of experimental data, and dramatically reduce the workload on technicians who oversee the animal experiment. For example, in one embodiment, electronic monitor 100 may permit at least 5 mice in a cage to be observed for a period of at least about 2 weeks without direct, physical human intervention, such as opening of the cage. Under certain conditions electronic monitor 100 may permit at least 5 mice in a cage to be observed for at least about 3 weeks without direct, physical human intervention. In other exemplary embodiments, electronic monitor 100 may permit at least 2 mice in a cage to be observed for at least about 2 months, or for the entire timespan of an experiment, without such human intervention.

In addition to obviating direct, physical human interaction, electronic monitors 100 can couple to cages 110 in a manner that does not otherwise interfere with the experimental animals. For example, electronic monitors 100 may obviate a need to surgically implant or otherwise insert any sensor, needle, or other device into the body of an experimental animal or to tether the experimental animal in any way. Furthermore, by coupling to cages 110 that are substantially closed from all sides, electronic monitors 100 may be capable of handling husbandry and experimental tasks without placing detectors 250 or sensors 280 in contact with the atmosphere of the living space 145 of the experimental animals.

Figure 5:
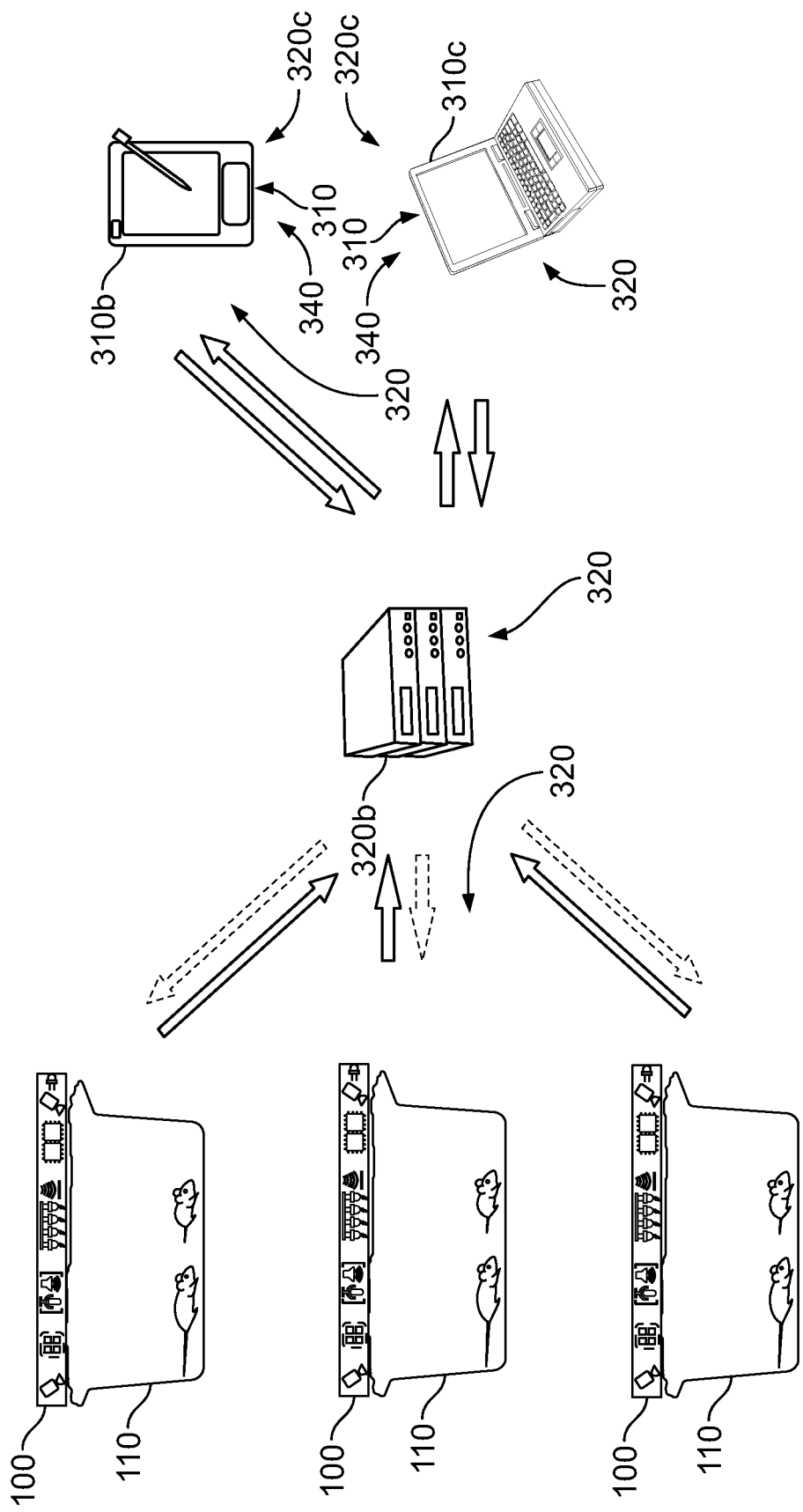
FIG. 5 is a schematic diagram of an example of an embodiment of multiple electronic monitors respectively coupled to cages and interfaced with a human observer.

In one version, one of user interfaces 310 is disposed at a location that is not mechanically attached to housing 120 of electronic monitor 100. FIG. 5 illustrates an example of an embodiment of multiple electronic monitors 100 respectively coupled to cages 110 and interfaced with a human observer. In this embodiment, arrayed electronic monitors 100 communicate with an array controller 320b, such as a set of servers, that stores and processes the data from sensors 130, 240, 280, detectors 250, weight scales 300, or controller 320a of electronic monitors 100. Array controller 320b may serve, for example, a rack or multiple racks of electronic monitors 100. Client devices 340 having user interfaces 310b,c, and controllers 320c which may be referred to as "client devices," may connect to array controller 320b. Client devices 340 may include, for example, personal computers (PCs), tablet computers, smartphones, or other suitable devices. The communication between client devices 340 and array controller 320b may be bidirectional, such as duplex. Client devices 340 may thereby control and/or request additional information from array controller 320b. Communication between electronic monitors 100 and array controller 330 may be unidirectional from electronic monitors 100 to array controller 320b. Alternatively, however, this communication may be bidirectional, such as duplex. Client devices 340 or array controller 320b may thereby control and/or request additional information from electronic monitors 100.

Figure 6:
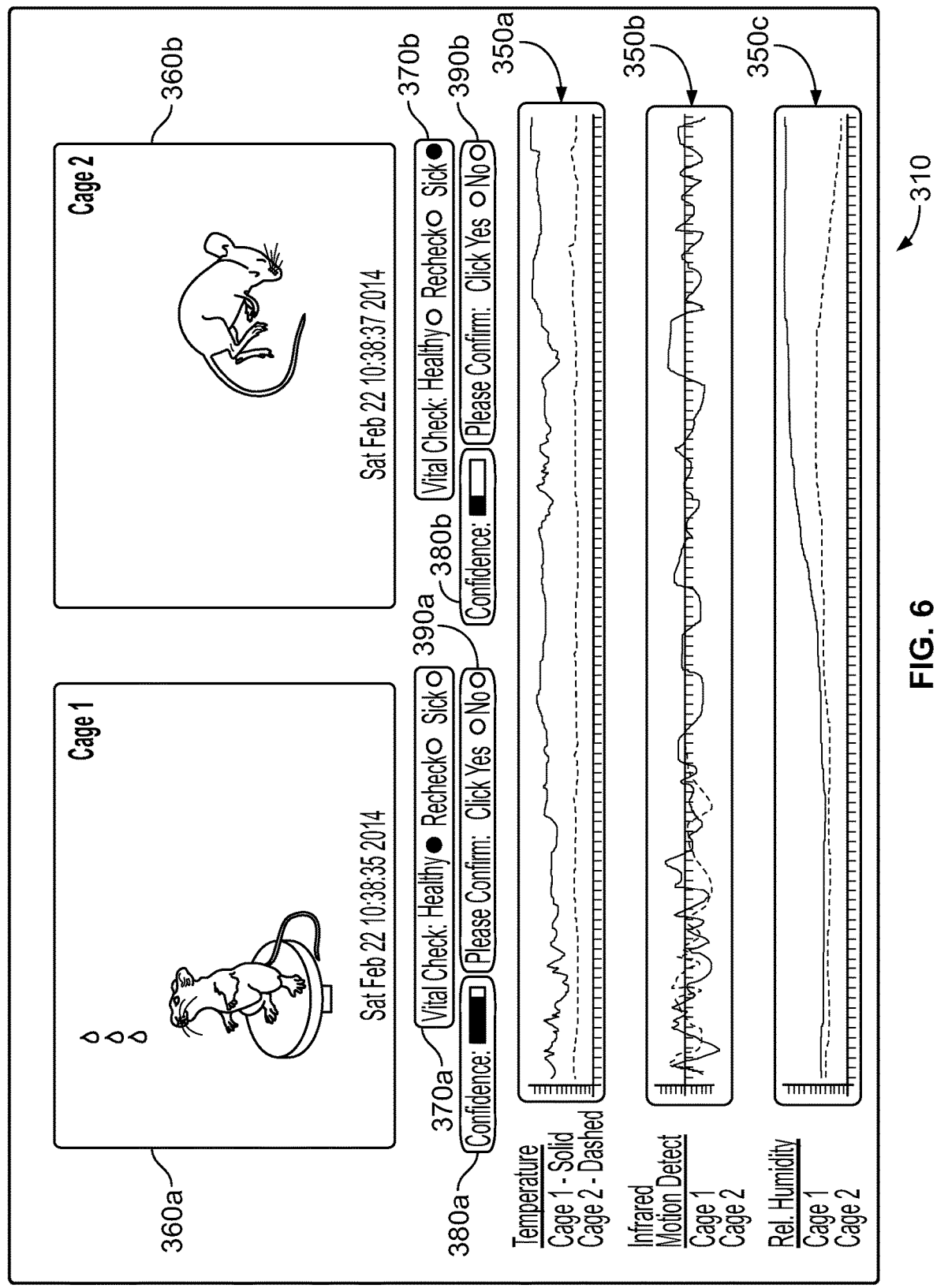
FIG. 6 is an illustration of an example of an embodiment of a display of a user interface of an electronic monitor that is presented for a human observer.

FIG. 6 illustrates an example of an embodiment of a display of a user interface 310 of electronic monitors for a human operator. User interface 310 may be present, for example, on client devices 340. Monitored metrics 350a-c are displayed in a "fused" manner. In this example, videos 360a,b of experimental animals in living spaces in two different cages, or alternatively two regions or views in the same cage, are being observed simultaneously. Furthermore, states 370a,b associated with the animals being observed, such as states predicted by controller 320, are displayed. States 370a,b may include one or more of the physiological, behavioral, environmental, or other annotations described above. States 370a,b may be associated with respective confidence levels 380a,b and input interfaces 390a,b for the human operator to confirm or reject the predicted states, such as for feedback to a machine learning algorithm being executed by controller 320 to improve the accuracy of future predictions.

Returning to FIGS. 1A, 1B, 4, and 5 for the sake of exemplary illustration, the raw data from ambient sensors 130, atmospheric sensors 240, electromagnetic detectors 250, acoustic sensors 280, and/or weight scales 300 of electronic monitors 100 may be processed by controller 320 (which may include one or more of controller 320a, array controller 320b, and controller 320c) to condense the data into reduced-size data sets in one or more sequential stages corresponding to different locations. This may be desirable when there are practical limitations on data throughput. Condensing the data sets may refer to summarizing, compiling, compressing (by either lossy or lossless methods), and/or indexing the data sets. Condensing a video stream, for example, may involve decreasing frame rate or time-lapsing frames from the video stream, providing thumbnails of frames from the video stream, images that each represents a summed series of periodic exposures over time (such as to quickly visualize movement of the animals), or any other suitable method. In one example, a video stream can be compressed according to the H.264 video compression format. Condensing a numerical metric, such as temperature, humidity, or ammonia level, may involve, for example, decreasing resolution of the metric over time where the metric is in a predefined range that is considered normal or uninteresting, and increasing resolution of the metric where the metric is in a range that is deemed interesting.

Figure 7:
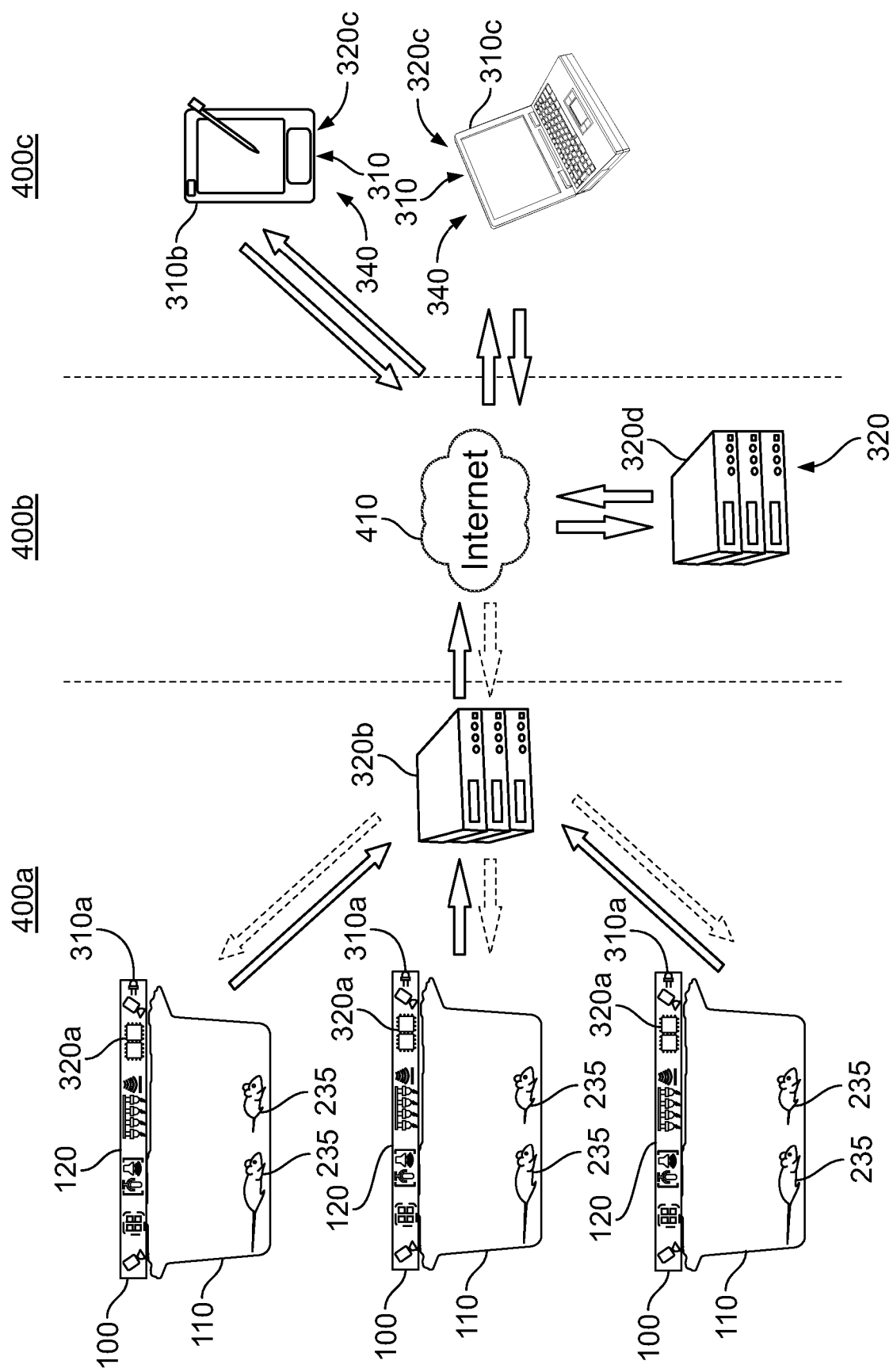
FIG. 7 is a schematic diagram of an example of an embodiment of multiple electronic monitors respectively coupled to cages and interfaced with a human observer.

FIG. 7 illustrates another embodiment of multiple electronic monitors 100 respectively coupled to cages 110 and interfaced with a human observer. In this embodiment, electronic monitors 100 and their controllers 320a-d distribute data across at least three different physical locations 400a,b,c. In first location 400a, electronic monitors 100 monitor experimental animals 235 in cages 110. Ambient sensors 130, atmospheric sensors 240, electromagnetic detectors 250, acoustic sensors 280, and/or weight scales 300 (such as shown in the examples of FIGS. 1A, 1B, and 4) of electronic monitors 100 generate raw data at housings 120 of electronic monitors 110. Controllers 320a disposed on housings 120 may process raw data to a predefined extent to generate more useful data. The data from these controllers 320a may then be transmitted to an array controller 320b, such as a set of servers, that stores and further processes, and/or conveys, the data from housings 120. Array controller 320b may serve an array of electronic monitors 100, such as for example a rack or multiple racks of electronic monitors 100. For example, array controller 320b may serve an entire facility containing multiple rows of racks of electronic monitors 100. Array controller 320b may additionally interface to an external network 410, such as the Internet, and one or more storage and/or processing servers 320d connected to the Internet (which may be referred to as "the cloud").

The "cloud" functionality represented by servers 320d may be provided by a third party in one embodiment. For example, the storage and/or processing "cloud" functionality of servers 320d may be provided by Amazon Web Services (AWS), available from Amazon.com, Inc., of Seattle, Wash.; Google Compute Engine or Google App Engine, available from Google Inc. of Menlo Park, Calif.; or IBM Smart-Cloud, available from International Business Machines Corporation of Armonk, N.Y.

In this embodiment, client devices 340 having user interfaces 310b,c may connect to external network 410 to interface with servers 320d. The communication between client devices 340 and server 320d may be bidirectional, such as duplex. For example, client devices 340 may request information about the experimental animals from servers 320d, and server 320d may provide the requested information to client devices 340. Client devices 340 may also be used to browse a summary or other guide to information available on servers 320d.

In one embodiment, communication between electronic monitors 100 and array controller 320b, and/or communication between array controller 320b and servers 320d on external network 410, may be unidirectional from electronic monitors 100 to servers 320d. Alternatively, however, this communication may be bidirectional, such as duplex. Bidirectional communication may permit client devices 340 to control and/or request additional information from electronic monitors 100 and/or array controller 320b. In one example, client devices 340 could request and receive a substantially real-time video feed from one of cages 110 of interest for viewing by a human operator. Or, in other examples, client devices 340 could request and receive less condensed data from array controller 320b; client devices 340 could change monitoring settings at electronic monitors 100; client devices 340 could provide feedback for a machine-learning algorithm being executed by controllers 320a, array controller 320b, controllers 320c on client devices 340 themselves, or servers 320d; or client devices 340 could alert human technicians at location 400a, such as for example by illuminating an LED on user interface 310a.

Controller 320 (which may include one or more of controller 320a, array controller 320b, controller 320c, and servers 320d) may also cross-reference data sets from different metrics to improve the quality of the condensed data. In one version, data for one set of metrics is used to condense another metric. For example, if the first set of metrics is within an expected or otherwise "normal" range for a certain timespan, a video stream corresponding to the same timespan may be condensed or even eliminated for viewing at a downstream location. If, however, one of those metrics is outside of a normal range for a particular timespan, or if the set of metrics matches a predetermined trend or signature, a video stream corresponding to that timespan may be transmitted and/or stored in a less condensed form. The less condensed form may involve, for example, lossless compression as opposed to lossy compression, a higher resolution, or a higher frame rate.

Furthermore, controller 320 (or a human supervisor) receiving downstream data may instruct one or more of the ambient sensors 130, atmospheric sensors 240, electromagnetic detectors 250, acoustic sensors 280, and/or weight scales 300 to actually generate higher-resolution raw data for a cage, time period, or physical area of one of cages 110 that is deemed unusually interesting. For example, controller 320 may determine that one of the metrics is currently outside of a normal range, or that a set of metrics are matching a predetermined trend or signature, and instruct one or more of the sensors or detectors described above to turn on or generate data at a higher resolution for a predefined time period. In one example, an anomalous metric may trigger controller 320 to turn on video cameras to record the experimental animals in a cage at high resolution and continuously for a predefined timespan.

In another version, data from electronic monitors 100 is transmitted in a substantially raw form to a remote location. A human supervisor at the remote location may monitor the data from electronic monitors 100, observe the data for one or more predefined conditions, and, if one of predefined conditions is present, intentionally send a signal back to one of electronic monitors 100 indicating that a particular condition is present at that electronic monitor of which local human supervisors should be aware. In response, one of user interfaces 310a on housing 120 or at a local client device (such as a tablet or PC) may display an alert to the local human supervisors. The predefined condition may be, for example, a type of anomaly, a recognizable trend in one or more of the observed metrics, or an expected life event (such as, for example, a pregnancy or death of an animal). This arrangement may be desirable where, for example, the costs associated with the electronic transmission of the data in raw form are less than the cost savings associated with outsourcing human monitoring of the raw data to a remote location.

The examples of data transmission and monitoring configurations described above are not intended to be mutually exclusive. For example, data for certain metrics may be transmitted in substantially raw form while other measured data may be condensed for downstream transmission. In one embodiment, for example, numerical metrics, such as temperature, humidity, or ammonia level, may be transmitted downstream in substantially raw form, while a video stream that is more data-intensive may be condensed for downstream transmission.

Although the foregoing embodiments have been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of ordinary skill in the art upon reading this disclosure, each of the individual aspects described and illustrated herein has discrete components and features which may be readily separated from or combined with the features of any of the other several aspects without departing from the scope or spirit of the disclosure. Any recited method can be carried out in the order of events recited or in any other order that is logically possible. Accordingly, the preceding merely provides illustrative examples. It will be appreciated that those of ordinary skill in the art will be able to devise various arrangements which, although not explicitly described or shown herein, embody the principles of the disclosure and are included within its spirit and scope.

Furthermore, all examples and conditional language recited herein are principally intended to aid the reader in understanding the principles of the invention and the concepts contributed by the inventors to furthering the art, and are to be construed without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary configurations shown and described herein.

In this specification, various preferred embodiments have been described with reference to the accompanying drawings. It will be apparent, however, that various other modifications and changes may be made thereto and additional embodiments may be implemented without departing from the broader scope of the claims that follow. The specification and drawings are accordingly to be regarded in an illustrative rather than restrictive sense.

We claim:

1. An electronic monitor for monitoring one or more experimental animals in a cage when coupled to the cage in a coupling position, the cage comprising one or more walls that enclose a living space for containing the one or more experimental animals, at least one of the walls comprising a signal-interface section, the electronic monitor comprising:

a housing adapted to be mechanically coupled to the cage in a predefined position relative to the cage when the electronic monitor is coupled to the cage;

an electromagnetic detector coupled to the housing at a predefined position, the predefined position having a line-of-sight through the signal-interface section and into the living space when the electronic monitor is coupled to the cage, the electromagnetic detector being adapted to detect electromagnetic radiation that is transmitted through the signal-interface section; and a controller to receive a signal from the electromagnetic detector that relates to the detected electromagnetic radiation, and process the signal from the electromagnetic detector to output:

a state signal that indicates a status of the one or more experimental animals or the living space, and a confidence level corresponding to a level of confidence in the accuracy of the state signal, wherein there is a substantially sterile barrier between the living space and the external environment when the electronic monitor is coupled to the cage.

2. The electronic monitor of claim 1, wherein the controller is adapted to receive a feedback input from a human supervisor that confirms or rejects the accuracy of the state signal.

3. The electronic monitor of claim 2, wherein the controller is adapted to perform a machine learning algorithm based on the feedback input to improve the accuracy of future state signals.

4. The electronic monitor of claim 3, wherein the controller is adapted to receive repeated feedback from the human supervisor and automatically learn to associate the received signal from the electromagnetic detector with a particular condition.

5. The electronic monitor of claim 2, further comprising a user input interface for the human supervisor to enter the feedback input.

6. The electronic monitor of claim 2, wherein the human supervisor is located substantially remote from the cage, and the controller is adapted to receive the feedback input from the human supervisor.

7. The electronic monitor of claim 1, further comprising a human-perceptible indicator on the housing, wherein the controller is disposed on the housing and the controller is adapted to transmit the state signal to the indicator to indicate the status of the one or more experimental animals to a human supervisor.

8. The electronic monitor of claim 7, wherein the indicator is adapted to display the state signal as a visible signal to the human supervisor.

9. The electronic monitor of claim 7, wherein the indicator is adapted to emit the state signal as an audible signal to the human supervisor.

10. The electronic monitor of claim 1, wherein the electromagnetic detector comprises a camera.

11. The electronic monitor of claim 10, wherein the camera is a light-field camera.

12. The electronic monitor of claim 1, wherein the state signal is one of a plurality of a state signals, the status is one of a plurality of statuses, and the confidence level is one of a plurality of confidence levels, and the controller is adapted to receive one or more signals from the electromagnetic detector that relate to the detected electromagnetic radiation, and process the signals from the electromagnetic detector to output:

the plurality of state signals that indicate the plurality of statuses, respectively, of the one or more experimental animals or the living space, and the plurality of confidence levels corresponding to levels of confidence in the accuracy of the respective plurality of state signals.

13. The electronic monitor of claim 12, wherein the one or more experimental animals comprise a plurality of experimental animals, the plurality of signals correspond to the respective plurality of experimental animals, and the controller is adapted to process the signals from the electromagnetic detector to output the plurality of state signals that indicate the plurality of statuses, the plurality of statuses corresponding to the respective plurality of experimental animals.

14. The electronic monitor of claim 1, wherein the controller is adapted to receive one or more parameter settings from a human supervisor and process the signal from the electromagnetic detector based on the one or more parameter settings to generate the state signal or the confidence level.

15. The electronic monitor of claim 1, wherein the electronic monitor is adapted to transmit the state signal to a human-perceptible indicator that is at a location substantially remote from the cage, whereby a human supervisor at the remote location may monitor the status of the one or more experimental animals or the living space.

16. The electronic monitor of claim 1, wherein the state signal indicates that at least one of the one or more experimental animals are healthy or sick, and the controller is adapted to process the signal from the electromagnetic detector to output the state signal.

17. The electronic monitor of claim 1, wherein the housing comprises a substantially airtight enclosure, the substantially airtight enclosure containing the electromagnetic detector therein.

18. An electronic monitor for monitoring one or more experimental animals in a cage when coupled to the cage in a coupling position, the cage comprising one or more walls that enclose a living space for containing the one or more experimental animals, at least one of the walls comprising a signal-interface section, the electronic monitor comprising:

a housing adapted to be mechanically coupled to the cage in a predefined position relative to the cage when the electronic monitor is coupled to the cage;

an electromagnetic detector coupled to the housing at a predefined position, the predefined position having a line-of-sight through the signal-interface section and into the living space when the electronic monitor is coupled to the cage, the electromagnetic detector being adapted to detect electromagnetic radiation that is transmitted through the signal-interface section; and a controller to receive a signal from the electromagnetic detector that relates to the detected electromagnetic radiation, process the signal from the electromagnetic detector to output:

a state signal that indicates a status of the one or more experimental animals or the living space, and a confidence level corresponding to a level of confidence in the accuracy of the state signal, and receive a feedback input from a human supervisor that confirms or rejects the accuracy of the state signal, wherein there is a substantially sterile barrier between the living space and the external environment when the electronic monitor is coupled to the cage.

19. An electronic monitor for monitoring one or more experimental animals in a cage when coupled to the cage in a coupling position, the cage comprising one or more walls that enclose a living space for containing the one or more experimental animals, at least one of the walls comprising a signal-interface section, the electronic monitor comprising:
- a housing adapted to be mechanically coupled to the cage in a predefined position relative to the cage when the electronic monitor is coupled to the cage;
- an electromagnetic detector coupled to the housing at a predefined position, the predefined position having a line-of-sight through the signal-interface section and into the living space when the electronic monitor is coupled to the cage, the electromagnetic detector being adapted to detect electromagnetic radiation that is transmitted through the signal-interface section; and
- a controller to receive one or more parameter settings from a human supervisor, receive a signal from the electromagnetic detector that relates to the detected electromagnetic radiation, and process the signal from the electromagnetic detector based on the one or more parameter settings to output:
    - a state signal that indicates a status of the one or more experimental animals or the living space, and
    - a confidence level corresponding to a level of confidence in the accuracy of the state signal, and
  receive a feedback input from the human supervisor that confirms or rejects the accuracy of the state signal,
wherein there is a substantially sterile barrier between the living space and the external environment when the electronic monitor is coupled to the cage.

20. An electronic monitor for monitoring one or more experimental animals in a cage when coupled to the cage in a coupling position, the cage comprising one or more walls that enclose a living space for containing the one or more experimental animals, at least one of the walls comprising a signal-interface section, the electronic monitor comprising:
- a housing adapted to be mechanically coupled to the cage in a predefined position relative to the cage when the electronic monitor is coupled to the cage;
- an electromagnetic detector coupled to the housing at a predefined position, the predefined position having a line-of-sight through the signal-interface section and into the living space when the electronic monitor is coupled to the cage, the electromagnetic detector being adapted to detect electromagnetic radiation that is transmitted through the signal-interface section; and
- a controller to receive one or more signals from the electromagnetic detector that relate to the detected electromagnetic radiation, and process the one or more signals from the electromagnetic detector to output:
    - a plurality of state signals that indicates a plurality of statuses, respectively, of the one or more experimental animals or the living space, and
    - a plurality of confidence levels corresponding to levels of confidence in the accuracy of the respective state signals,
wherein there is a substantially sterile barrier between the living space and the external environment when the electronic monitor is coupled to the cage.

* * * * *